No. 668,307. Patented Feb. 19, 1901.
F. F. FENLASON.
PULLEY.
(Application filed Sept. 18, 1900.)
(No Model.)
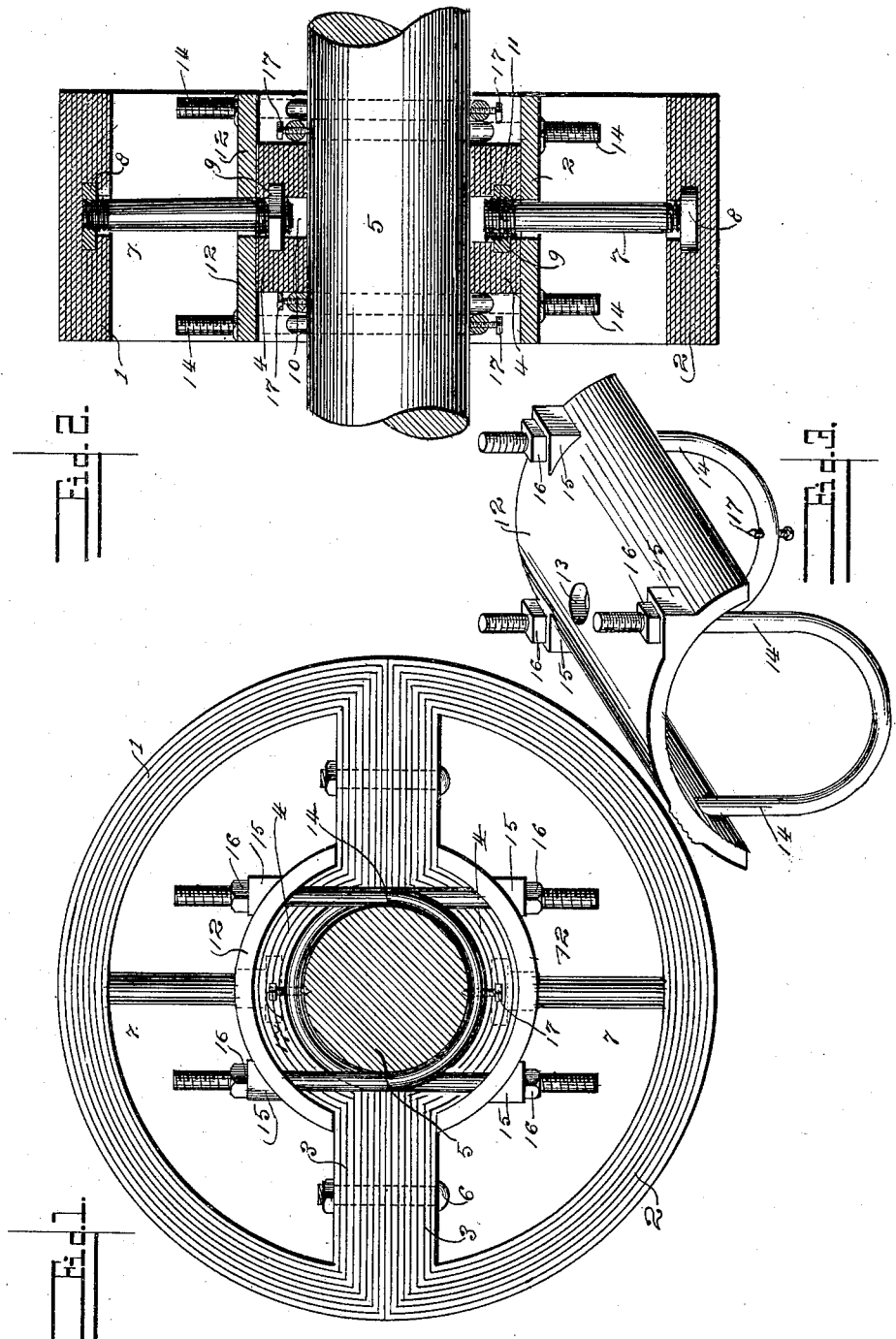

UNITED STATES PATENT OFFICE.

FRED F. FENLASON, OF SEATTLE, WASHINGTON.

PULLEY.

SPECIFICATION forming part of Letters Patent No. 668,307, dated February 19, 1901.

Application filed September 18, 1900. Serial No. 30,415. (No model.)

*To all whom it may concern:*

Be it known that I, FRED F. FENLASON, a citizen of the United States, residing at Seattle, in the county of King and State of Washington, have invented a new and useful Pulley, of which the following is a specification.

This invention relates to split pulleys, and has for its object to provide improved means for securing the same to a shaft and to accommodate the pulley to shafts of different diameters. It is furthermore designed to provide improved means for stiffening and bracing the pulley and also to arrange such means for truing the pulley whenever it becomes necessary without removing the same from the shaft.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a pulley constructed in accordance with the present invention. Fig. 2 is a transverse central sectional view thereof. Fig. 3 is a detail perspective view of one of the clamping devices for connecting the pulley to a shaft.

Corresponding parts are designated by like characters of reference in all of the figures of the drawings.

Referring to the drawings, 1 and 2 designate, respectively, the opposite duplicate half-sections of a split pulley, each section being built up by layers of paper or veneer, as plainly indicated in Fig. 2 of the drawings. Each section is provided with a pulley-arm 3, the intermediate portion of which is bowed outwardly, as indicated at 4, to form a concaved seat for the reception of the shaft 5. The opposite arms are connected by means of suitable fastenings 6, located between the rim of the pulley and the shaft-seats. Instead of extending entirely through both arms these fastenings may be carried by one arm and engage a recess in the other arm, this latter arrangement being preferable for small light pulleys.

Each pulley-section is provided with one or more spokes 7, extending between the intermediate portion of the pulley-arm and the rim of the pulley, the opposite ends of the spoke being screw-threaded and engaged with the nuts 8 and 9, embedded in the rim and the arm, respectively, during the formation of the pulley. The nut in the rim is round and fits loosely therein, so as to be capable of being turned, and thereby form a swiveled head for the spoke, while the nut in the arm is angular, so as to be held against turning. As best shown in Fig. 2 of the drawings, it will be seen that the arm is provided with an opening 10, corresponding in size to the bolt-opening of the nut 9, and the bolt-opening of the nut in the rim is smaller than the opening in the nut 9; also, the diameter of the greater part of the spoke is smaller than the openings in the arm and the nut 9, so that it may be passed through the same and engaged with the nut in the rim, the inner end of the spoke having an enlarged screw-threaded head 11 to fit the bolt-opening of the nut 9. By this arrangement the spokes may be readily placed in position, and by turning the same they may be employed to force the rim outwardly, and thereby form means for truing the pulley.

The means for securing the pulley to a shaft comprises the opposite bowed plates 12, which snugly fit the outer convex sides of the shaft-seats and also project beyond the opposite ends thereof, as best shown in Fig. 2. The intermediate portion of each plate is provided with an opening 13 for the reception of the adjacent spoke. The opposite ends of the plate are provided with pairs of openings for the reception of the respective ends of the substantially U-shaped clamps or clips 14, which embrace the shaft and have their ends screw-threaded and projected at the outer or convex sides of the plates. At the points where the openings are formed in the plates the latter are thickened or provided with lugs 15, so as to form flat seats for the nuts 16, which are fitted to the screw-threaded ends of the clips. As best shown in Fig. 2 of the drawings, the clips or clamps are arranged in pairs at opposite sides of the pulley-arm, the clamps of one plate being located between those of the other plate and the adjacent sides of the pulley-arm. In the middle of the bowed portion of each clip or clamp there is provided a pointed set-screw 17, which is designed to be set into the shaft, so as to hold the clips in place. By this arrangement it will be seen that the pulley may be fitted to shafts of different sizes by the employment of bushings in the shaft-seat and by the adjustment of the nuts 16.

As best shown in Fig. 3 of the drawings, it is apparent that each plate 12 and its pair of clips form a single fastening, which is complete in itself and performs its function of securing the adjacent half of the pulley to the shaft independently of the opposite fastening, and therefore in a solid pulley one such fastening would be sufficient.

To provide for truing the pulley, the inner portions of the screw-threads at the outer end of each spoke are made slightly larger or are given a different pitch from those of the outer threads, so that after the spoke enters the nut 8 it will firmly bind therein, whereby the nut becomes a head fixed to and designed to turn with the spoke. It will now be understood that the nuts 8 are round, so as to turn in the rim of the pulley. Thus by turning the spokes which have their outer ends swiveled to the rim the latter may be drawn inwardly and forced outwardly to true the pulley.

What is claimed is—

1. A pulley, comprising a hub, a rim, spokes or arms connecting the same, U-shaped shaft-embracing clips lying at the exterior of the opposite ends of the hub, detachable connections between the clips and the respective ends of the hub, and adjustable shaft-engaging fastenings carried by the clips and accessible when the latter are in place.

2. A split pulley, comprising opposite half-sections, opposite bowed plates embracing the hub of the pulley and projected at opposite ends thereof, substantially U-shaped fastenings lying at the opposite ends of the hub, and having their opposite ends connected to the projected ends of the respective plates, and hub-engaging screws carried by the intermediate bowed portions of the U-shaped fastenings.

3. A pulley comprising a rim, a hub, and spokes the hub having radial openings, and nuts embedded in the hub and having their bolt-openings corresponding to the respective openings in the hub, other nuts with smaller bolt-openings embedded in the rim, the spokes being of a size to pass loosely through the hub-nuts and engage the rim-nuts, and also provided at their inner ends with enlarged screw-threaded heads to fit the hub-nuts.

4. A split pulley, comprising a hub having radial screw-threaded openings formed therethrough, a rim having swiveled nuts embedded therein and corresponding to the radial openings of the hub, the inner side of the rim having openings corresponding to and also for access to the openings of the embedded nuts, and truing devices, which are passed outwardly through the radial openings in the hub and into the openings in the rim, the outer ends of the truing devices being screw-threaded and fitted to the respective swiveled nuts, and the inner ends of said devices having enlarged screw-threaded heads which fit the screw-threaded openings in the hub.

5. A split pulley, comprising a hub having radial screw-threaded openings formed therethrough, a rim having swiveled nuts embedded therein and corresponding to the radial openings of the hub, the inner side of the rim having openings corresponding to and also for access to the openings of the embedded nuts, and truing devices which are passed outwardly through the radial openings of the hub and into the openings in the rim, the outer ends of the truing devices being externally screw-threaded and fitted to the swiveled nuts, the inner portions of the screw-threaded ends differing from the outer portions thereof, whereby said inner portions bind upon the swiveled nuts and fixedly connect the latter to the truing devices, and the inner ends of the truing devices having enlarged externally-screw-threaded heads adjustably engaging the screw-threaded openings of the hub.

6. A pulley, comprising a hub, a rim, spokes or arms connecting the same, and means for detachably connecting the pulley to a shaft, consisting in a plate fitted to the exterior of the hub and projected at opposite ends thereof, substantially U-shaped shaft-embracing clips lying at the exterior of the opposite ends of the hub and having their opposite ends detachably connected to the respective projected ends of the plate, and shaft-engaging screws piercing the respective clips.

In testimony that I claim the foregoing as my own I have hereto affixed my signature in the presence of two witnesses.

FRED F. FENLASON.

Witnesses:
JUSTICE M. MATHEWS,
AUSTIN F. CROMWELL.